(12) United States Patent
Lin

(10) Patent No.: US 10,195,869 B1
(45) Date of Patent: Feb. 5, 2019

(54) BREAKING SWITCH FOR INK FEEDING CHANNEL AND PRINTING DEVICE USING THE SAME

(71) Applicant: HON HAI PRECISION INDUSTRY CO., LTD., New Taipei (TW)

(72) Inventor: Kao-Hung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/859,334

(22) Filed: Dec. 30, 2017

(30) Foreign Application Priority Data

Oct. 19, 2017 (CN) .......................... 2017 1 0980653

(51) Int. Cl.
*B41J 2/175* (2006.01)
*F16L 55/10* (2006.01)

(52) U.S. Cl.
CPC ........... *B41J 2/17596* (2013.01); *B41J 2/175* (2013.01); *F16L 55/1018* (2013.01)

(58) Field of Classification Search
CPC .................................................. B41J 2/17596
See application file for complete search history.

(56) References Cited

U.S. PATENT DOCUMENTS

| 2002/0109758 | A1* | 8/2002 | Kono | B41J 2/16511 347/85 |
| 2013/0107281 | A1* | 5/2013 | Maekawa | B41J 15/042 358/1.1 |
| 2014/0085386 | A1* | 3/2014 | Wei et al. | B41J 2/17596 347/85 |
| 2017/0120617 | A1* | 5/2017 | Matsumura | B41J 2/17509 |

* cited by examiner

*Primary Examiner* — Shelby L Fidler
(74) *Attorney, Agent, or Firm* — ScienBiziP, P.C.

(57) ABSTRACT

A breaking switch for ink feeding channel and a printing device using the breaking switch prevents leakage of ink when a printing device is not level or not well placed. The printing device includes a case, an ink box, an ink feeding channel from the ink box, and a breaking switch for ink feeding channel. The breaking switch clamps or releases the ink feeding channel and includes a supporting base and a pressing plate. The pressing plate is rotatable between open and closed positions. When on a level working surface, the supporting leg lifts the pressing plate away from the supporting portion. When the supporting leg is free and suspended the pressing plate presses on the supporting portion and closes off the ink supply.

18 Claims, 3 Drawing Sheets

BREAKING SWITCH FOR INK FEEDING CHANNEL AND PRINTING DEVICE USING THE SAME

FIELD

The subject matter herein generally relates to printing, and a breaking switch for ink feeding channel and printing device using the breaking switch.

BACKGROUND

Generally, in a printing device, ink is stored in an ink box and fed to a printhead through an ink feeding channel. When the printing device is being moved or the printing device is not level, ink in the ink box can flow through the ink feeding channel and leakage can happen as a result. Therefore, a breaking switch for ink feeding channel would be helpful.

BRIEF DESCRIPTION OF THE DRAWINGS

Implementations of the present disclosure will now be described, by way of example only, with reference to the attached figures.

DETAILED DESCRIPTION

Figure 1:
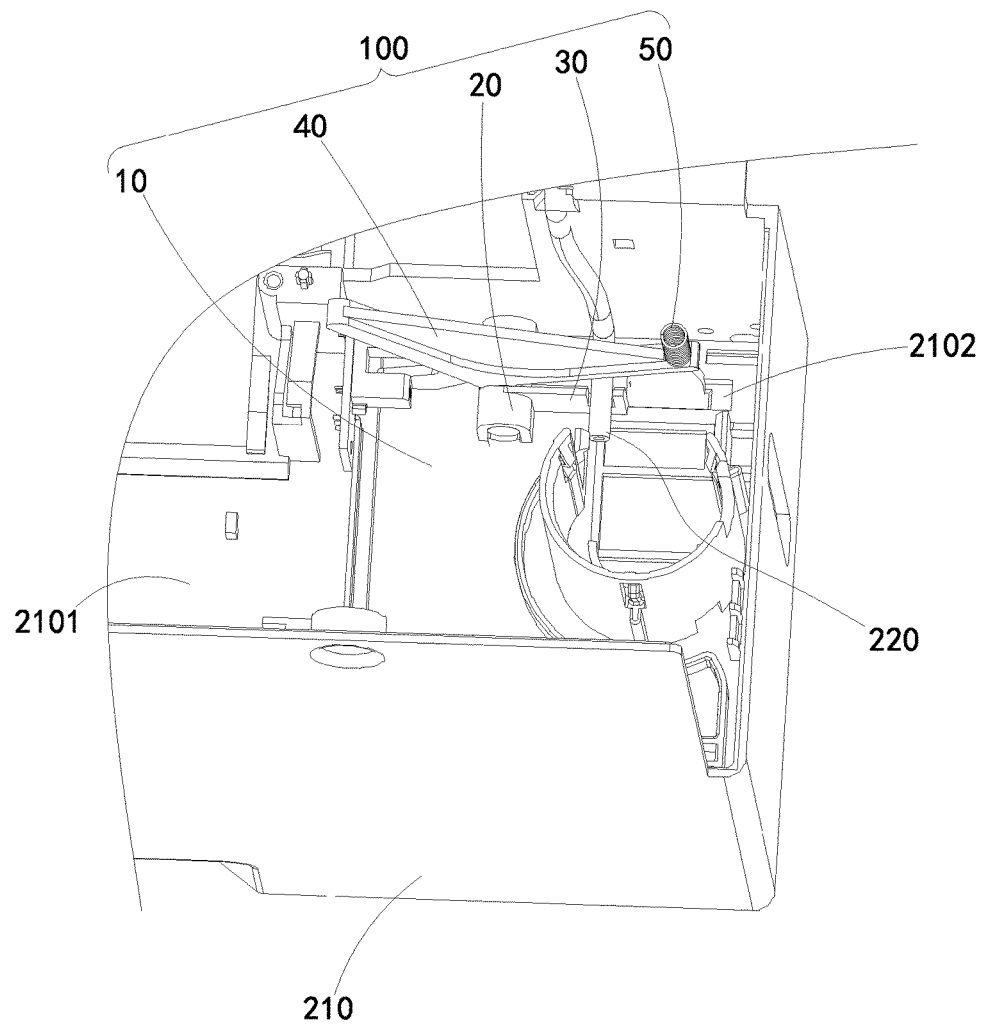
FIG. 1 is an isometric view of an exemplary embodiment of a printing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "comprising" means "including, but not necessarily limited to"; it specifically indicates open-ended inclusion or membership in a so-described combination, group, series, and the like.

Figure 2:
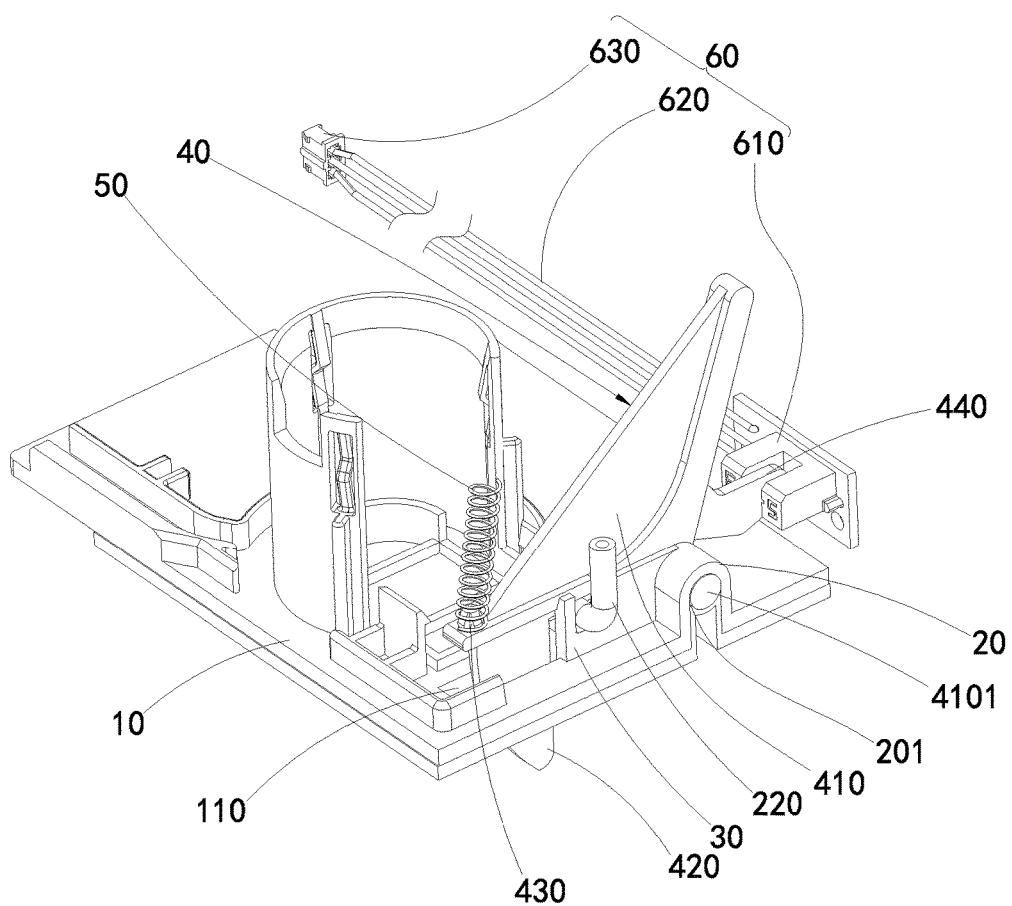
FIG. 2 is an isometric view of an exemplary embodiment of a breaking switch in the printing device in FIG. 1, wherein the breaking switch is in a closed state.
Figure 3:
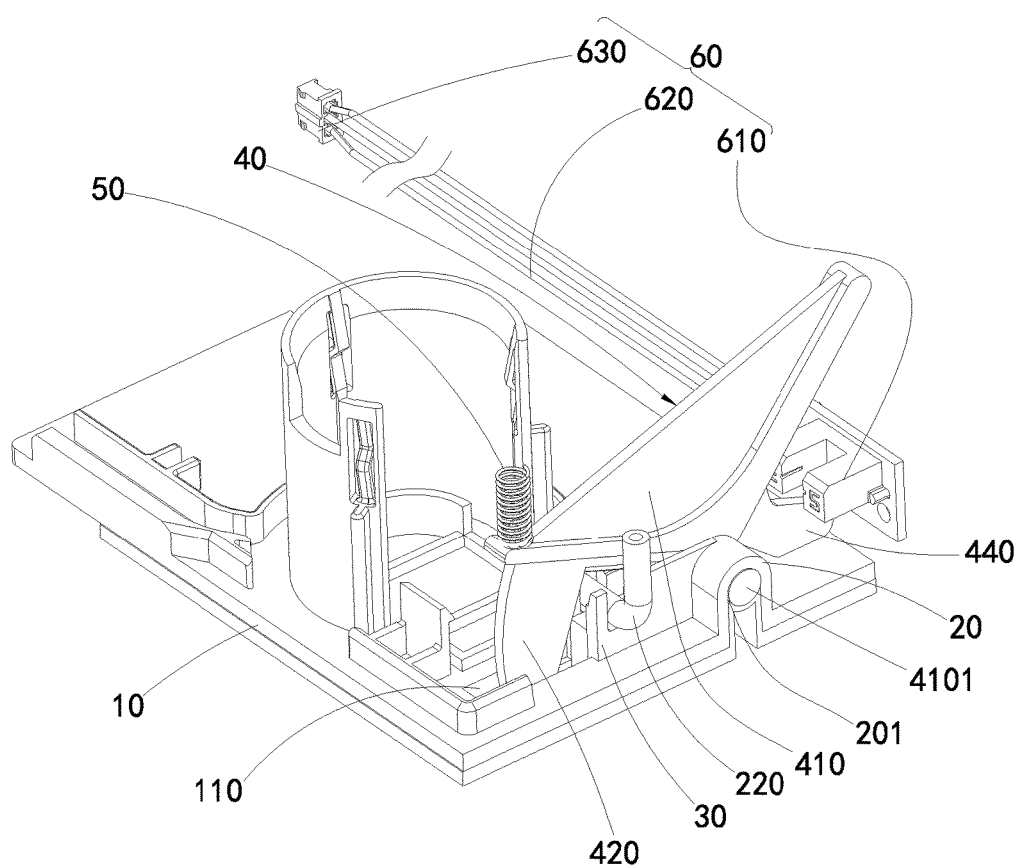
FIG. 3 is an isometric view of an exemplary embodiment of a breaking switch in the printing device in FIG. 1, wherein the breaking switch is in an open state.

FIGS. 1 to 3 illustrate a printing device 200. The printing device 200 may include a case 210, an ink box (not shown), an ink feeding channel 220, and a breaking switch 100 for the ink feeding channel 220. The ink feeding channel 220 is connected to the ink box. The breaking switch 100 is accommodated in the case 210.

The breaking switch 100 is configured to clamp or release the ink feeding channel 220.

The breaking switch 100 may include a supporting base 30 and a pressing plate 40. The pressing plate 40 is coupled to the supporting base 30 and the pressing plate 40 may rotate relative to the supporting base 30, so that the breaking switch 100 may clamp or release the ink feeding channel 220.

Specifically, the supporting base 30 may include a supporting portion (not labeled), the supporting portion may be used to support the ink feeding channel 220. The pressing plate 40 may include two opposing ends. One end of the pressing plate 40 is rotatably connected to the supporting base 30, while a lower side of the other end defines a supporting leg 420.

The pressing plate 40 is coupled to the supporting portion and the pressing plate 40 is rotatable between an open position and a closed position.

When the printing device 200 is placed on a surface, the breaking switch 100 is also in contact with the surface. The supporting leg 420 presses against the surface and lifts the pressing plate 40 away from the supporting portion. The pressing plate 40 is then in an open position, the ink feeding channel 220 is not obstructed and ink may flow through the ink feeding channel 220 normally.

When the printing device 200 is moved or not well placed, the supporting leg is free and suspended, and the pressing plate 40 will rotate under gravity to a clamping position. The clamping position is the closed position, and the ink feeding channel 220 is shut off by the clamping of the pressing plate 40 and the supporting base 30.

In at least one exemplary embodiment, the breaking switch 100 may further include a bottom plate 10. The supporting base 30 is mounted on the bottom plate 10. The bottom plate 10 defines a through hole 110 for the supporting leg 420 to pass through. Correspondingly, the case 210 includes a bottom wall 2101, the bottom plate 10 is mounted to the bottom wall 2101.

The bottom wall 2101 defines an opening 2102 corresponding to the through hole 110. The supporting leg 420 may pass through the through hole 110 and the opening 2102.

A side part of the pressing plate 40 forms a lever 410. One end (pivoted end) of the lever 410 defines a pivot pin 4101. An upper side of the bottom plate 10 defines a pivot base 20, and the pivot base 20 defines a pivot hole 201 coupled with the pivot pin 4101. The pivot base 20 may also be defined on the bottom wall 2101.

In at least one exemplary embodiment, the breaking switch 100 may further include an elastic member 50. An end of the elastic member 50 is connected to an upper side of the unpivoted end of the pressing plate 40. The other end of the elastic member 50 is connected to an external member, such as the case 210.

When the breaking switch 100 is placed on a working surface with the printing device 200, the supporting leg 420 lifts the pressing plate 40 away from the supporting portion, thus the elastic member 50 is elastically deformed. When the supporting leg 420 is free and suspended, the pressing plate 40 presses on the supporting portion under the resilience of the elastic member 50 and gravity of the pressing plate 40.

The elastic member 50 may be a spring, the unpivoted end of the pressing plate 40 may define a fixing portion 430. An end of the spring is connected to the fixing portion 430.

In at least one exemplary embodiment, the breaking switch 100 may further include a detecting unit 60. The detecting unit 60 is coupled to the unpivoted end of the pressing plate 40.

The detecting unit 60 determines whether the pressing plate 40 is in the open position or the closed position by detecting position of the unpivoted/pivoted end of the pressing plate 40. When the pressing plate 40 is in the closed position, the detecting unit 60 sends a closed signal to a control unit of the printing device 200, so that the printing device 200 may shut down when ink cannot be fed through the ink feeding channel 220 normally.

The detecting unit may include a sensor 610, a signal line 620, and a connector 630. The sensor 610 is configured to detect position of the pivoted/unpivoted end of the pressing plate 40. The signal line 620 is configured to transmit signals. The connector 630 is configured to connect to an external controller, such as the controlling unit of the printing device 200. The sensor 610 is connected to the connector 630 through the signal line 620.

The pivoted/unpivoted end of the pressing plate defines an extension portion 440 coupled to the sensor 610. The sensor 610 may be a photoelectric beam sensor. When beam of the sensor 610 is interrupted by the extension portion 440, the pressing plate 40 may be determined as being in the closed position.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A breaking switch for ink feeding channel, the breaking switch is configured to clamp or release the ink feeding channel, the breaking switch comprising:
   a supporting base comprising a supporting portion, wherein the supporting portion is configured to support the ink feeding channel; and
   a pressing plate comprising two opposing ends, wherein one of the two opposing ends is rotatably connected to the supporting base, a lower side of the other one of the two opposing ends defines a supporting leg;
   wherein the pressing plate is coupled to the supporting portion and rotatable between an open position, where breaking switch is placed on a working surface and the supporting leg lifts the pressing plate apart from the supporting portion, and a closed position, where the supporting leg is suspended and the pressing plate presses on the supporting portion.

2. The breaking switch of claim 1, wherein the breaking switch further comprises a bottom plate; the supporting base is mounted on the bottom plate; the bottom plate defines a through hole for the supporting leg to pass through.

3. The breaking switch of claim 2, wherein one of the two opposing ends of the pressing plate defines a pivot pin; an upper side of the bottom plate defines a pivot base, and the pivot base defines a pivot hole coupled with the pivot pin.

4. The breaking switch of claim 1, wherein the breaking switch further comprises an elastic member, an end of the elastic member is connected to an upper side of the other one of the two opposing ends of the pressing plate, and another end of the elastic member is connected to an external member;
   when the breaking switch is placed on a working surface and the supporting leg lifts the pressing plate apart from the supporting portion, the elastic member is elastically deformed; when the supporting leg is suspended, the pressing plate presses on the supporting portion under resilience of the elastic member and gravity of the pressing plate.

5. The breaking switch of claim 4, wherein the elastic member is a spring, the other one of the two opposing ends of the pressing plate defines a fixing portion, an end of the spring is connected to the fixing portion.

6. The breaking switch of claim 1, wherein the breaking switch further comprises a detecting unit coupled to the other one of the two opposing ends of the pressing plate;
   wherein the detecting unit is configured to determine whether the pressing plate is on the open position or the closed position by detecting position of the other one of the two opposing ends of the pressing plate, and when the pressing plate is on the closed position, the detecting unit sends a closed signal.

7. The breaking switch of claim 6, wherein the detecting unit comprises:
   a sensor configured to detecting position of the other one of the two opposing ends of the pressing plate;
   a signal line configured to transmit signals; and
   a connector configured to connect to an external controller;
   wherein the sensor is connected to the connector through the signal line.

8. The breaking switch of claim 7, wherein the other one of the two opposing ends of the pressing plate defines an extension portion coupled to the sensor.

9. The breaking switch of claim 8, wherein the sensor is a photoelectric beam sensor.

10. A printing device comprising:
    a case;
    an ink box;
    an ink feeding channel connected to the ink box; and
    a breaking switch for ink feeding channel, the breaking switch is configured to clamp or release the ink feeding channel, comprising:
       a supporting base comprising a supporting portion, wherein the supporting portion is configured to support the ink feeding channel; and
       a pressing plate comprising two opposing ends, wherein one of the two opposing ends is rotatably connected to the supporting base, a lower side of the other one of the two opposing ends defines a supporting leg;
    wherein the pressing plate is coupled to the supporting portion and rotatable between an open position, where breaking switch is placed on a working surface and the supporting leg lifts the pressing plate apart from the supporting portion, and a closed position, where the supporting leg is suspended and the pressing plate presses on the supporting portion.

11. The printing device of claim 10, wherein the breaking switch further comprises a bottom plate; the supporting base is mounted on the bottom plate; the bottom plate defines a through hole for the supporting leg to pass through.

12. The printing device of claim 11, wherein one of the two opposing ends of the pressing plate defines a pivot pin; an upper side of the bottom plate defines a pivot base, and the pivot base defines a pivot hole coupled with the pivot pin.

13. The printing device of claim 10, wherein the breaking switch further comprises an elastic member, an end of the elastic member is connected to an upper side of the other one of the two opposing ends of the pressing plate, and another end of the elastic member is connected to an external member;

when the breaking switch is placed on a working surface and the supporting leg lifts the pressing plate apart from the supporting portion, the elastic member is elastically deformed; when the supporting leg is suspended, the pressing plate presses on the supporting portion under resilience of the elastic member and gravity of the pressing plate.

14. The printing device of claim 13, wherein the elastic member is a spring, the other one of the two opposing ends of the pressing plate defines a fixing portion, an end of the spring is connected to the fixing portion.

15. The printing device of claim 10, wherein the breaking switch further comprises a detecting unit coupled to the other one of the two opposing ends of the pressing plate;
wherein the detecting unit is configured to determine whether the pressing plate is on the open position or the closed position by detecting position of the other one of the two opposing ends of the pressing plate, and when the pressing plate is on the closed position, the detecting unit sends a closed signal.

16. The printing device of claim 15, wherein the detecting unit comprises:
 a sensor configured to detecting position of the other one of the two opposing ends of the pressing plate;
 a signal line configured to transmit signals; and
 a connector configured to connect to an external controller;
 wherein the sensor is connected to the connector through the signal line.

17. The printing device of claim 16, wherein the other one of the two opposing ends of the pressing plate defines an extension portion coupled to the sensor.

18. The printing device of claim 17, wherein the sensor is a photoelectric beam sensor.

* * * * *